April 3, 1962 — A. N. STANTON — 3,028,578
ACOUSTIC AIRSPEED INDICATOR
Filed May 25, 1956 — 2 Sheets-Sheet 1

INVENTOR.
Austin N. Stanton
BY
*Wm. T. Wofford*
ATTORNEY

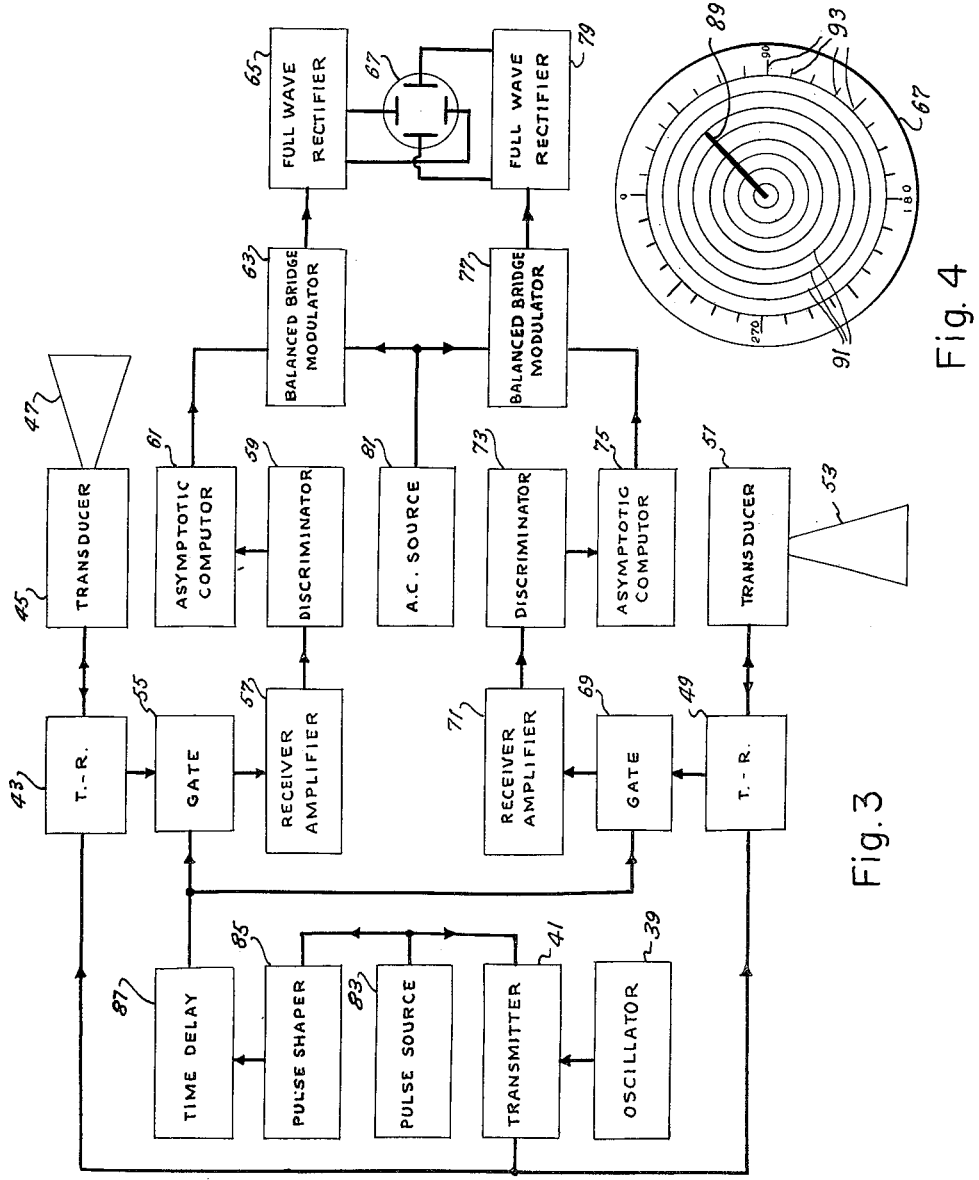

__ United States Patent Office __ 3,028,578
Patented Apr. 3, 1962

3,028,578
ACOUSTIC AIRSPEED INDICATOR
Austin N. Stanton, Garland, Tex., assignor to Varo, Inc.
Filed May 25, 1956, Ser. No. 587,431
4 Claims. (Cl. 340—1)

My invention relates to airspeed indicator devices, and more particularly to novel air speed indicators utilizing acoustic phenomena and designed for use where conditions are such as to render conventional air-impact type devices unsuitable.

The airspeed of winged aircraft is ordinarily measured by a pressure differential system which compares the impact air pressure generated by relative movement of the craft with respect to the air medium, and static air pressure. The key element of this system is the Pitot-static tube, which is the sensing device. For satisfactory operation, the Pitot-static tube must be mounted at a point where air turbulence due to the aircraft propulsion means and to movement of the craft through the air, is at a minimum. In the case of a helicopter, the large overhead rotor creates extensive air turbulence in the entire vicinity so that there is no spot on the craft where a Pitot-static tube can be mounted to function satisfactorily except possibly for the upper portion of the helicopter speed range where the turbulent air may be swept rearward to such extent that it does not strike the forward portions of the craft. Although accurate airspeed indication is extremely important to the helicopter pilot for both navigation and safety, particularly under conditions of poor visibility when hovering near obstacles at low speeds, no satisfactory airspeed indicator has yet been devised.

It is accordingly an object of my invention to provide a satisfactory airspeed indicator for a helicopter.

Another object of my invention is to provide an airspeed indicator of such nature that air turbulence is not a deterrent to its satisfactory operation.

Another object of my invention is to provide an airspeed indicator which is capable of measuring very low airspeeds.

Another object of my invention is to provide an airspeed indicator which utilizes air turbulences generated by the propulsion means of the aircraft with which it is associated.

Another object of my invention is to provide an airspeed indicator utilizing acoustic phenomena.

Another object of my invention is to provide a system for indicating the airspeed of a helicopter along its flight path and also the flight path direction.

These and other objects are effected by my invention as will be apparent from the following description taken in accordance with the accompanying drawings, forming a part of this application, in which:

FIG. 3 is a schematic block diagram showing another embodiment of my invention; and FIG. 4 is an enlarged view of the face of the cathode ray indicator of FIG. 3.

The rotor of a helicopter in flight generates a complex pattern of air turbulence. This pattern includes numerous pressure differential areas, or pressure difference interfaces which are moving quite rapidly at and near the craft and decrease in velocity with increase in distance from the craft.

These interfaces are capable of reflecting a portion of impinging sound wave energy. It is possible by use of doppler techniques to detect relative motion between the aircraft and the pressure difference interfaces. If it were possible to obtain sound energy reflections from the undisturbed air some distance away from the aircraft, then determination of airspeed would be relatively a simple matter, but this unfortunately is not possible. My invention contemplates the derivation of information pertaining to relative motion between the aircraft and the interfaces above-mentioned, and utilization of this information to obtain indications of airspeed. The relative motion detected further and further from the aircraft will approach closer and closer the relative motion of the aircraft with respect to the undisturbed air. Systems in accordance with my invention will in effect produce a plot of relative motion magnitudes as a function of distance from the craft and then provide for extrapolation to obtain an asymptotic value to provide a representation of the actual airspeed of the craft.

Figure 1:
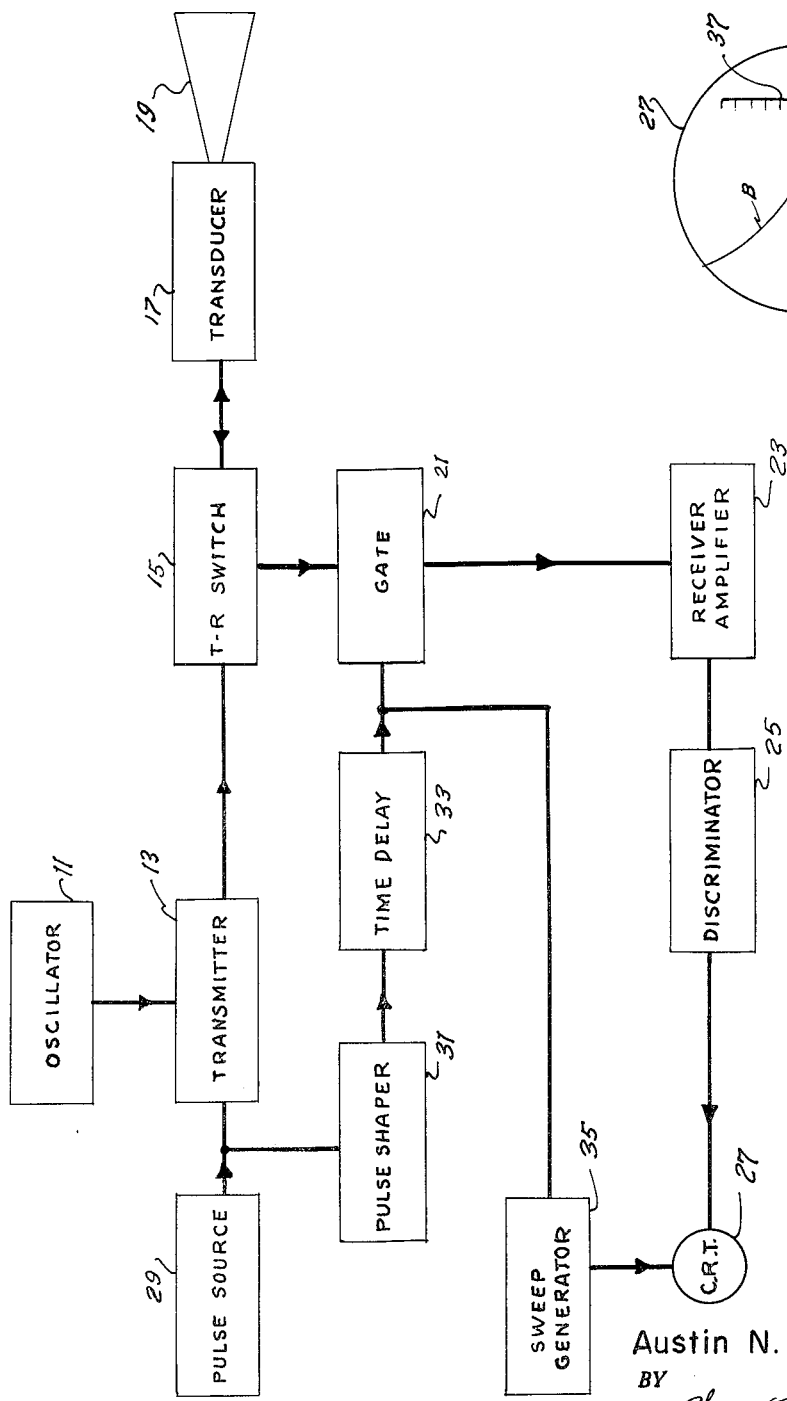
FIG. 1 is a schematic block diagram showing one embodiment of my invention.

In FIG. 1 there is shown an oscillator 11 feeding a transmitter 13 which has its output connected through a transmit-receive switch 15 (hereinafter called a T-R switch) to a transducer 17 which is associated with a director horn 19. The director and transducer can receive as well as transmit. For receiving, the transducer is connected through the T-R switch and a gate device 21 to a receiver-amplifier 23. The receiver-amplifier has its output connected to a discriminator 25, the output of which is connected to the vertical plates of a cathode ray indicator 27. A pulse source 29 has its output connected to key the transmitter. The pulse source output is also connected to a pulse shaper 31, which has its output connected through a time delay device 33 to the gate device and also to a sweep generator 35. The sweep generator output is connected to the horizontal plates of the cathode ray indicator. All of the individual components shown in FIG. 1 may be conventional type devices which are familiar to those skilled in the art. The transmit-receive switch may be of the general type similar to those used in radar applications, and which is capable of blocking the receiver during transmission and blocking the transmitter during reception, and of course, allowing passage of transmitted signals and received signals in turn. The transmitter output frequency is preferably in the ultrasonic range. The pulse source output is a square wave form which periodically keys the transmitter on for a suitable period so that periodically a short burst or train of ultrasonic sound energy emanates from the director. The pulse shaper acts to convert a portion of the keying pulse to a trigger pulse, which acts to open the gate and also to start the sweep generator. The discriminator is designed to give voltage outputs which are proportional to the frequencies received.

Figure 2:
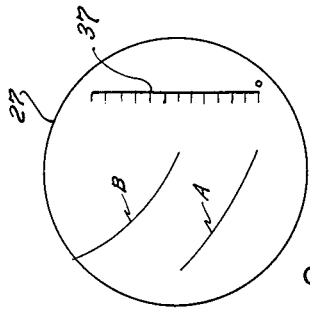
FIG. 2 is an enlarged view of the face of the cathode ray indicator of FIG. 1.

In operation of the system of FIG. 1, successive bursts of sound energy waves of ultrasonic frequency are transmitted in a predetermined direction with respect to the helicopter longitudinal axis. During the intervals between bursts, reflections will be received. Since reflections from pressure interfaces in the region up close to the helicopter are not wanted, the time delay is made such that the gate is not opened until after the reflection time for these unwanted signals has passed. The gate device automatically returns itself to the closed state at a predetermined time after it has been opened and before the start of the next burst. Consequently, only those reflections from pressure interfaces that lie within a predetermined distance region away from the helicopter are received. The inner limit of this region is the distance at which usable wanted reflections first occur, and the outer limit is determined by the minimum usable energy level of reflected waves. In other words, the gate is opened at a time corresponding to the time of arrival of the first usable reflected energy, and remains open until the magnitude of the reflections from distance interfaces becomes too small to be effectively utilized. Since there will be a relative movement between the helicopter and the pressure interfaces from which reflections are received, the frequency of the energy returned from each interface will have shifted from the transmitted frequency to a degree determined by the magnitude of the relative movement in each case, due to the well known doppler effect. The received energy then will have frequencies lying within a band of frequencies. This band of received frequencies will be passed by the receiver-amplifier to the discriminator. The discriminator output will be a voltage of magnitude representing the instantaneous average of frequencies being received. The discriminator output is then displayed as a function of time on the face of the cathode ray indicator. An enlarged schematic representation of the cathode ray indicator display is shown by FIG. 2. At the right side of the indicator face is a vertical speed scale 37, with zero speed indicated at the bottom of the scale. Curve A represents the trace of the discriminator output voltage under the condition of zero airspeed. The time scale is from left to right on the indicator face. As hereinbefore stated, the relative motion between the pressure interfaces and the helicopter decreases with distance out from the helicopter. This accounts for the decreasing magnitude of the doppler frequency shift as shown by curve A. If it were possible to receive reflections from the undisturbed air at great distances from the helicopter, then the trace could be extended further to the right and would actually intersect the speed scale, and the point of intersection would represent the helicopter airspeed, but since this is not possible, the curve must be extrapolated to its asymptotic value. In the instant case, the extrapolation is done visually, and a corresponding airspeed is read on the scale. The system is initially calibrated so that the asymptotic value of the trace corresponds to the zero reading on the indicator scale for the condition of zero airspeed. As the helicopter airspeed increases above zero, the entire trace shifts upward by an amount corresponding to the increase in airspeed from zero. Curve B represents the trace as it would appear at an airspeed substantially above zero. The entire trace moves up and down as the helicopter airspeed increases and decreases, and the extrapolated asymptotic value of the trace as read on the speed scale always represents the helicopter airspeed in the direction of the transmitted sound energy.

The system just described provides indications of relative speed of the aircraft with respect to the undisturbed air in direction in which the sound energy is transmitted. If this direction does not correspond to the aircraft flight path direction, then a correction factor must be derived and applied in order to arrive at the airspeed of the craft along its flight path. It is preferable that the sound energy always be transmitted in the direction of the aircraft flight path, which in the case of a helicopter is often not along the longitudinal axis of the craft. It is possible, however, to provide means for keeping the sound energy director oriented in the direction of craft travel. It may be desirable to read speed both in the positive and negative directions. This may be done by calibrating the system so that the extrapolated asymptotic value of the trace is near the center of the speed scale for the zero airspeed condition, with positive and negative speeds marked on the scale above and below the zero speed mark, respectively. The sensitivity of the system may be improved by simultaneously transmitting the sound energy in both directions along the craft flight path. This would require no additional transmitting equipment except an additional transducer and director, but would require two separate receiver-amplifier and discriminator channels, and there would be two traces displayed instead of one. In this case, airspeed would be represented by the distance between the extrapolated asymptotic values of the two traces. It is not essential that visual curve extrapolation be employed. Instead it is possible to feed information to a computer device which computes the curve asymptotic value, which then may be displayed directly as airspeed.

Further, it is possible to transmit the sound energy bursts in a plurality of directions, compute the asymptotic value for each curve, feed the results to a vectorial resolver, and obtain an indication of both airspeed and direction of flight path. One such system is illustrated by FIG. 3 wherein there is shown an oscillator 39 feeding a transmitter 41 which has its output connected through a first T-R switch 43 to a first transducer 45 which is associated with a first director horn 47, and also through a second T-R switch 49 to a second transducer 51 which is associated with a second director horn 53. The director horns are oriented so that the path of sound energy emanating from the second horn is displaced 90 degrees from that of the first. The directors and transducers can receive as well as transmit. For receiving, the first transducer 45 is connected through the first T-R switch 43 and a first gate device 55 to a first receiver-amplifier 57, which has its output connected to a first discriminator 59. The output of the first discriminator is connected to a first asymptotic computer 61, which has its output connected to one input of a first balanced bridge type modulator 63. The modulator output is fed to a first full wave rectifier 65 which has its output connected to the vertical plates of a cathode ray indicator 67. The second transducer 51 is connected through the second T-R switch 49 and a second receiver-amplifier 71, which has its output connected to a second discriminator 73. The output of the second discriminator is connected to a second asymptotic computer 75, which has its output connected to one input of a second balanced bridge type modulator 77. The second modulator output is fed to a second full wave rectifier 79 which has its output connected to the horizontal plates of the cathode ray indicator 67. An alternating current source 81 has its output connected to feed the other input of each modulator 63, 77. A pulse source 83 has its output connected to key the transmitter 41. The pulse source output is also connected through a pulse shaper 85 and a time delay device 87 to the first and second gate devices 55, 69. The transmitter, oscillator, pulse source, pulse shaper, time delay, T-R switches, transducers, director horns, gate devices, receiver-amplifiers, and discriminators of FIG. 3 may all be of the same types as those of FIG. 1. The first and second discriminator output voltages will be similiar to those of the discriminator of FIG. 1 as represented by curves A and B of FIG. 2. The asymptotic computers 61, 75 act to extrapolate the respective discriminator output voltages to their asymptotic values. The computer output is a direct current voltage the magnitude of which represents the asymptotic value of the input voltage. The computer output voltage is positive when the asymptotic value is within a range above a predetermined magnitude, and is negative when the asymptotic value is within a range below the predetermined magnitude, for a purpose to be hereinafter explained. The balanced bridge modulator accepts direct current voltage at the other, and its output is alternating current voltage having magnitude proportional to that of its direct current input. The phase of the modulator output shifts 180 degrees when the polarity of the direct current input changes. The alternating current source output has constant frequency and amplitude.

In operation of the system of FIG. 3, successive bursts of sound energy waves are transmitted outward from the aircraft along two paths at right angles to each other. During the intervals between bursts, reflections will be received. Since reflections from pressure interfaces in the region up close to the aircraft are not wanted, the time delay is made such that the gates are not opened until after the reflection time for these unwanted signals has passed. The gate devices automatically return to the closed state at a predetermined time after opening. The length of time the gates remain open is determined in the same manner as hereinbefore discussed in connection with FIG. 1.

The wanted reflected energy from each path then is received at the respective direction horn and is passed along in its respective channel to a respective discriminator. The discriminator outputs are fed to respective asymptotic computers. The magnitude of the voltage output of the first asymptotic computer 61 will be proportional to the relative motion of the aircraft with respect to the undisturbed air in the direction along the path of sound energy emanating from the first director horn 47. The polarity of the computer output will be positive or negative depending upon whether the first director horn is approaching or receding with respect to the undisturbed air in the direction of its sound energy path. Likewise, the magnitude of the output of the second asymptotic computer 75 will be proportional to the relative motion of the aircraft with respect to the undisturbed air in the direction along the path of sound energy emanating from the second director horn 53, and the polarity of the computer output will be positive or negative depending upon whether the second director horn is approaching or receding with respect to the undisturbed air in the direction of its sound energy path. The modulator outputs will be alternating current voltages having magnitude proportional to that of their direct current inputs and phase dependent upon the polarity of the direct current inputs. The full wave rectifier outputs will have magnitudes proportional to that of their inputs and polarity depending upon the phase of the inputs. The cathode ray indicator 67 acts as a vectorial resolver and presents a radial trace 89 which represents the airspeed and flight path direction of the aircraft. An enlarged schematic representation of the cathode ray indicator display is shown by FIG. 4. The concentric circles 91 on the indicator face are airspeed markers, and the marks 93 around the circumference of the largest circle indicate flight path direction. Assume that the first director horn 47 is aligned with the aircraft longitudinal axis and is directed ahead of the craft, while the second horn 53 is aligned in the direction transverse with the aircraft longitudinal axis and directed to right side. Assume that the aircraft flight path is in the direction forward and to the right with respect to its longitudinal axis. Then computer outputs will both be positive and the phase of the modulator outputs will be such as to cause the rectifier outputs to make the top vertical and right hand horizontal plates of the indicator positive. The trace on the indicator face will then lie in the first quadrant as shown in FIG. 4, and will have a length corresponding to the vectorial sum of the modulator output magnitudes. If the aircraft flight path were forward and to the left, the first computer output would be positive while the second computer output would be negative and the rectifier outputs would be such as to make the top vertical plate of indicator positive and the left horizontal plate positive, causing the trace to appear in the fourth quadrant. It is apparent from the foregoing that the system of FIG. 3 provides for indication of both the airspeed of an aircraft such as a helicopter along its flight path and the direction of its flight path.

The foregoing disclosure and the showings made in the drawings are merely illustrative of the principles of my invention and are not to be interpreted in a limiting sense.

I claim:

1. A system for determining airspeed of helicopter type aircraft having a rotor which generates pressure difference interfaces which move outwardly from the aircraft comprising, a sound wave generator, a sound wave director arranged to direct sound wave energy from said generator in a path outward from the helicopter toward said interfaces, means for keying said generator to produce periodic trains of sound wave energy, a receiver for receiving reflections of said sound wave energy from said interfaces, apparatus associated with said receiver for deriving signals having magnitudes proportional to the frequency differential between the transmitted and the received sound wave energy, and means for displaying a plot of said signal magnitudes.

2. An airspeed indicator system for a helicopter having a rotor which generates pressure difference interfaces which move outwardly from the helicopter comprising, means for generating and transmitting periodic trains of sound wave energy from the helicopter toward said interfaces, means for receiving reflections of said energy from said interfaces during intervals between transmission of successive trains, means for detecting the doppler frequency shift of said reflections, means for displaying said frequency shifts on the face of a cathode ray indicator device, and a speed scale on said indicator face.

3. A speed indicator system for a helicopter having a rotor which generates pressure difference interfaces which move outwardly from the aircraft comprising, means for generating and transmitting periodic trains of sound wave energy from said helicopter toward said interfaces, means for receiving reflections of said energy from said interfaces during intervals between the transmission of successive trains of wave energy, and means for detecting the frequency shift of said reflected wave energy.

4. A speed indicator system for a helicopter having a rotor which generates pressure difference interfaces which move outwardly from the helicopter comprising, means for generating and transmitting periodic trains of sound wave energy from said helicopter toward said interfaces, means for receiving reflections of said energy from said interfaces during intervals between the transmission of successive trains of wave energy, and means responsive to said last mentioned means for giving a visual indication of the instantaneous average of the frequencies of the reflections of said wave energy.

References Cited in the file of this patent

UNITED STATES PATENTS

| | | |
|---|---|---|
| 2,476,032 | Feldman | July 12, 1949 |
| 2,770,795 | Peterson | Nov. 13, 1956 |
| 2,937,808 | Newell | May 24, 1960 |